(12) United States Patent
Kitaguchi

(10) Patent No.: US 7,505,088 B2
(45) Date of Patent: Mar. 17, 2009

(54) SIGNAL SELECTOR SELECTING ONE OF A GROUND WAVE DIGITAL SIGNAL AND A DIGITAL CABLE TELEVISION SIGNAL IN ACCORDANCE WITH PROGRAM SELECTION INFORMATION AND TRANSMITS THE SELECTED SIGNAL TO A TUNER

(75) Inventor: Masanori Kitaguchi, Habikino (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 581 days.

(21) Appl. No.: 11/204,100

(22) Filed: Aug. 16, 2005

(65) Prior Publication Data

US 2006/0038924 A1     Feb. 23, 2006

(30) Foreign Application Priority Data

Aug. 19, 2004 (JP) ............................. 2004-239767

(51) Int. Cl.
*H04N 5/50* (2006.01)
*H04N 5/268* (2006.01)
*H04N 3/27* (2006.01)
*H04N 5/46* (2006.01)

(52) U.S. Cl. ...................... 348/731; 348/554; 348/558; 348/706

(58) Field of Classification Search ................ 348/725, 348/726, 731, 554–556, 558, 705; 725/38, 725/151

See application file for complete search history.

(56) References Cited

U.S. PATENT DOCUMENTS

| 6,421,098 | B1* | 7/2002 | Oya ........................... 348/678 |
| 6,430,236 | B1  | 8/2002 | Funakoshi |
| 6,486,925 | B1* | 11/2002 | Ko ............................. 348/731 |
| 6,704,060 | B2* | 3/2004 | Levandowski .............. 348/725 |
| 6,847,407 | B2* | 1/2005 | Min ........................... 348/565 |
| 7,194,753 | B1* | 3/2007 | Fries et al. .................... 725/38 |
| 7,236,760 | B2* | 6/2007 | Cowley et al. .............. 455/302 |
| 2001/0033625 | A1* | 10/2001 | Ninomiya et al. ........... 375/316 |
| 2002/0057381 | A1  | 5/2002 | Yamamoto et al. |

FOREIGN PATENT DOCUMENTS

| CN | 1340964 A | 3/2002 |
| JP | 11-187411 A | 7/1999 |
| JP | 11-355681 A | 12/1999 |
| JP | 2001-285752 A | 10/2001 |
| JP | 2002-247461 A | 8/2002 |

* cited by examiner

*Primary Examiner*—Victor R Kostak
(74) *Attorney, Agent, or Firm*—Birch, Stewart, Kolasch & Birch, LLP

(57) ABSTRACT

A signal selector selects one of a ground wave digital signal and a digital cable television signal in accordance with program selection information and transmits the selected signal to a shared tuner circuit. The shared tuner circuit selects only a signal of a desired channel from a signal output from the signal selector and converts the selected signal to an IF signal. An 8VSB and QAM demodulation circuit receives the IF signal from the shared tuner circuit and demodulate the signal in an 8VSB or QAM system to generate a transport stream. Thus a tuner for ground wave digital broadcasting and that for digital CATV broadcasting can be implemented as a shared tuner circuit surrounded by a single casing.

9 Claims, 10 Drawing Sheets

FIG.2

| | IN VIEWING GROUND WAVE DIGITAL BROADCAST | | IN VIEWING DIGITAL CATV BROADCAST | |
|---|---|---|---|---|
| | STATE OF OPERATION | ISOLATION | STATE OF OPERATION | ISOLATION |
| SELECT CIRCUIT 21 | THROUGH | 0dB | 75Ω TERMINATION | 30dB |
| BROADBAND AMP 23 | AMPLIFICATION OPERATION(15dB) | -15dB | INACTIVATED | 25dB |
| SWITCH CIRCUIT 24 | ON | 0dB | OFF | 10dB |
| SELECT CIRCUIT 28 | 75Ω TERMINATION | 30dB | THROUGH | 0dB |
| BROADBAND AMP 30 | INACTIVATED | 25dB | AMPLIFICATION OPERATION(10dB) | -10dB |
| SELECT CIRCUIT 25 | SELECT GROUND WAVE DIGITAL SIGNAL | 30dB | SELECT DIGITAL CATV SIGNAL | 30dB |
| 8VSB & QAM DEMODULATION CIRCUIT 7 | 8VSB DEMODULATION | — | QAM DEMODULATION | — |
| ISOLATION IN TOTAL (WORST VALUE) | — | 70dB | — | 85dB |
| ISOLATION IN TOTAL (54-216MHz) | — | 95dB | — | 110dB |

FIG.3

| | MINIMUM LEVEL | MAXIMUM LEVEL | WORST D/U RATIO |
|---|---|---|---|
| GROUND WAVE DIGITAL SIGNAL | -84dBm | -8dBm | 50dB |
| DIGITAL CATV SIGNAL | -64dBm | -34dBm | 56dB |

FIG.5

| | IN VIEWING GROUND WAVE DIGITAL BROADCAST | | IN VIEWING DIGITAL CATV BROADCAST | |
|---|---|---|---|---|
| | STATE OF OPERATION | ISOLATION | STATE OF OPERATION | ISOLATION |
| BROADBAND AMP 41 | AMPLIFICATION OPERATION(15dB) | −15dB | INACTIVATED | 25dB |
| SWITCH CIRCUIT 42 | ON | 0dB | OFF | 15dB |
| SWITCH CIRCUIT 43 | OFF | 15dB | ON | 0dB |
| SELECT CIRCUIT 46 | 75Ω TERMINATION | 30dB | THROUGH | 0dB |
| SELECT CIRCUIT 44 | SELECT GROUND WAVE DIGITAL SIGNAL | 30dB | SELECT DIGITAL CATV SIGNAL | 30dB |
| 8VSB & QAM DEMODULATION CIRCUIT 7 | 8VSB DEMODULATION | — | QAM DEMODULATION | — |
| ISOLATION IN TOTAL (WORST VALUE) | — | 60dB | — | 70dB |
| ISOLATION IN TOTAL(54-216MHz) | — | 85dB | — | 95dB |

FIG.7

|  | IN VIEWING GROUND WAVE DIGITAL BROADCAST | | IN VIEWING DIGITAL CATV BROADCAST | |
|---|---|---|---|---|
|  | STATE OF OPERATION | ISOLATION | STATE OF OPERATION | ISOLATION |
| VARIABLE AMP 61 | VARIABLE AMPLIFICATION OPERATION (-25~20dB) | -20~25dB | MAXIMUM ATTENUATION OPERATION (-25dB) | 25dB |
| SWITCH CIRCUIT 62 | ON | 0dB | OFF | 15dB |
| VARIABLE ATTENUATOR 65 | MAXIMUM ATTENUATION OPERATION (-25dB) | 25dB | VARIABLE ATTENUATION OPERATION (-25~0dB) | 0~25dB |
| BROADBAND AMP 66 | INACTIVATED | 25dB | AMPLIFICATION OPERATION(10dB) | -10dB |
| SELECT CIRCUIT 63 | SELECT GROUND WAVE DIGITAL SIGNAL | 30dB | SELECT DIGITAL CATV SIGNAL | 30dB |
| 8VSB & QAM DEMODULATION CIRCUIT 7 | 8VSB DEMODULATION | — | QAM DEMODULATION | — |
| ISOLATION IN TOTAL (WORST VALUE) | — | 60dB | — | 60dB |
| ISOLATION IN TOTAL(54-216MHz) | — | 85dB | — | 85dB |

SIGNAL SELECTOR SELECTING ONE OF A GROUND WAVE DIGITAL SIGNAL AND A DIGITAL CABLE TELEVISION SIGNAL IN ACCORDANCE WITH PROGRAM SELECTION INFORMATION AND TRANSMITS THE SELECTED SIGNAL TO A TUNER

This nonprovisional application is based on Japanese Patent Application No. 2004-239767 filed with the Japan Patent Office on Aug. 19, 2004, the entire contents of which are hereby incorporated by reference.

BACKGROUND OF THE INVENTION

1. Field of the Invention

The present invention relates generally to tuners employed to receive digital broadcasts, and particularly to tuners employed to receive ground wave digital broadcasts and digital cable television broadcasts.

2. Description of the Background Art

In North America, ground wave digital broadcasting employs a ground wave digital signal, which is a signal modulated in an 8 vestigial side band (8VSB) modulation system and having a frequency band of 54 MHz-806 MHz. The ground wave digital signal is transmitted from a TV station, and received by each household antenna and supplied to a television set, a VTR or similar AV equipment having mounted a tuner therein for receiving ground wave digital broadcasts.

FIG. 10 is a block diagram showing a configuration of a tuner employed to receive ground wave digital broadcasts, as conventional, for North America. In the figure, the tuner includes a casing 91, an input terminal 92, a ground wave tuner circuit 93, an 8VSB demodulation circuit 94, and an output terminal 95.

Input terminal 92 receives through a coaxial cable a ground wave digital received by an antenna and provides the signal to ground wave tuner circuit 93. From ground wave digital signal of a frequency band of 54 MHz-806 MHz, ground wave tuner circuit 93 selects only a signal of a desired channel and converts the signal to an intermediate frequency (IF) signal. 8VSB demodulation circuit 94 receives the IF signal from ground wave tuner circuit 93 and demodulates the signal in the 8VSB system to generate a transport stream (a multiplexed data signal as defined by MPEG2) and provide it to output terminal 95. Furthermore, 8VSB demodulation circuit 94 automatically controls ground wave tuner circuit 93 in gain so that ground wave tuner circuit 93 outputs a signal having a constant level. Output terminal 95 receives the transport stream, which is converted by an external signal processing circuit to video, audio, and data signals.

In North America, digital cable television (hereinafter referred to as "CATV") broadcasting employs a digital CATV signal including a signal modulated by a quadrature amplitude modulation (QAM) system and having a frequency band of 54-864 MHz for forward application transport-channel (FAT-CH), and a signal modulated in a quadrature phase-shift keying (QPSK) system and having a frequency band of 70 MHz-130 MHz for forward data channel (FDC). Typically, a CATV station transmits a digital CATV signal which is in turn distributed through a coaxial cable to each household and supplied to a set top box rented from the CATV station for digital CATV. Furthermore, a CATV station having a bidirectional CATV system also employs an uplink signal modulated in the QAM or QPSK system and having a frequency band of 5 MHz-54 MHz for reverse data channel (RDC). This uplink signal is a signal for transmitting data to a CATV station from each household's set top box having a tuner mounted therein for receiving digital CATV broadcasts.

FIG. 11 is a block diagram showing a configuration of a tuner employed to receive digital CATV broadcasts, as conventional, for North America. In the figure, the tuner includes a casing 101, an input/output terminal 102, a coupling circuit 107, a distribution circuit 104, a FAT-CH tuner circuit 105, an FDC tuner circuit 106, a QAM demodulation circuit 107, a QPSK demodulation circuit 108, an RDC modulation circuit 109, a variable amplifier 110, output terminals 111 and 112, and an input terminal 113. This tuner accommodates bidirectional communication.

Input/output terminal 102 receives through a co-axial cable a digital CATV signal distributed from a CATV station. Coupling circuit 103 receives the digital CATV signal from input/output terminal 102 and transmits the signal to distribution circuit 104. Distribution circuit 104 receives the digital CATV signal from coupling circuit 103 and distributes the signal to FAT-CH and FDC tuner circuits 105 and 106. Distribution circuit 104 distributes the digital CATV signal's power equally.

FAT-CH tuner circuit 105 selects only a signal of a desired channel from digital CATV signals having the frequency band of 54 MHz-864 MHz (for forward application channel) and converts the selected signal to an IF signal. QAM demodulation circuit 107 receives the IF signal from FAT-CH tuner circuit 105 and demodulates the signal in the QAM system to generate a transport stream and provide it to output terminal 111. Furthermore, QAM demodulation circuit 107 automatically controls FAT-CH tuner circuit 105 in gain so that FAT-CH tuner circuit 105 outputs a signal having a constant level. Output terminal 111 receives the transport stream, which is in turn converted by an external signal processing circuit to video, audio and data signals.

FDC tuner circuit 106 selects only a signal arranged in the frequency band of 70 MHz-130 MHz for the forward data channel and converts the signal to an IF signal. QPSK demodulation circuit 8 receives the IF signal from FDC tuner circuit 106 and demodulates the signal in the QPSK system to generate a transport stream and provide it to output terminal 112. Furthermore, QAM demodulation circuit 108 automatically controls FDC tuner circuit 106 in gain so that FDC tuner circuit 106 outputs a signal having a constant level. Output terminal 112 receives the transport stream, which is in turn converted by an external signal processing circuit to an STB control signal applied to control a set top box (e.g., make a setting of whether a pay channel is receivable).

Input terminal 113 receives an externally transmitted data signal and passes the signal to RDC modulation circuit 109. RDC modulation circuit 109 receives the signal from input terminal 113 and modulates the signal in the QAM (or QPSK) system to provide a signal having the frequency band of 5 MHz-54 MHz (for the reverse data channel). Variable amplifier 110 receives the modulated signal from RDC modulation circuit 109 and amplifies it to attain an appropriate level. Coupling circuit 103 receives the amplified signal from variable amplifier 110 and transmits it to input/output terminal 102 as an uplink signal. Input/output terminal 102 receives the uplink signal and transmits it through the co-axial cable to a CATV station.

To promote ground wave digital broadcasting in North America, the Federal Communications Commission (FCC) has mandated TV receiver manufacturers as of July 2004 to mount in stages a tuner in broadcast reception devices to receive ground wave digital broadcasts. Furthermore, the FCC has also mandated mounting a tuner in digital broadcast reception devices to receive digital CATV broadcasts. Thus the tuner for ground wave digital broadcasts and that for digital CATV broadcasts must both be mounted in a broadcast reception device. As a result the device is increased in size, power consumption and price.

Japanese Patent Laying-Open No. 2001-285752 discloses a reception device accommodating multiple systems and easy to use for users. According thereto, it can change a screen smoothly for example in automatically switching to a demodulation circuit corresponding to a selected, modulated wave; changing digital and analog broadcasts seamlessly in channel; and/or switching an analog broadcast program to a digital broadcast program.

The conventional broadcast reception device having mounted both the tuner for ground wave digital broadcasts and that for CATV broadcasts thus has disadvantageously increased size, power consumption and price.

Furthermore, if the tuner for ground wave digital broadcasts and that for digital CATV broadcasts are implemented by a single shared tuner unit, substantially identical frequency bands are used, and isolation of an input terminal for a ground wave digital signal and that for a digital CATV signal (signal leakage degree) must sufficiently be considered. Furthermore, for the tuner for digital CATV broadcasts, a large number of channels including an adjacent channel is used. Accordingly, the tuner must be designed to prevent a distortion attributed to multichannel. By contrast, the tuner for ground wave digital broadcasts needs to be designed with noise figure (NF) significantly considered so as to accommodate a ground wave digital signal having a wide range in level. As such, it has been difficult to design a shared tuner unit receiving both ground wave digital and digital CATV broadcasts.

SUMMARY OF THE INVENTION

The present invention mainly contemplates a miniaturized, low power consumption, and inexpensive tuner that receives ground wave digital broadcasts and digital CATV broadcasts.

The present tuner receiving digital broadcasts includes: a first input terminal receiving a ground wave digital signal received by an antenna; a second input terminal receiving a digital cable television signal distributed through a cable; a signal select circuit for selecting in accordance with program selection information and outputting one of the ground wave digital signal and the digital cable television signal received from the first and second input terminals, respectively; and a tuning circuit for selecting a signal of a desired channel from a signal output from the signal select circuit. Ground wave digital and digital CATV broadcasts can thus be received by a miniaturized, low power consumption, and inexpensive tuner.

Preferably the signal select circuit includes a first switch circuit having one input terminal receiving the ground wave digital signal from the first input terminal, the other input terminal receiving the digital cable television signal from the second input terminal, and an output terminal connected to the tuning means at an input terminal. In accordance with the program selection information the firsts witch circuit selects one of the ground wave digital and digital cable television signals.

Preferably the signal select circuit further includes a second switch circuit provided between the first input terminal and one input terminal of the first switch circuit and/or between the second input terminal and the other input terminal of the first switch circuit, and passing and interrupting a corresponding signal selected and unselected, respectively, in accordance with the program selection information. Of the ground wave digital and digital cable television signals, only a signal selected in accordance with the program selection information is transmitted to the first switch circuit.

Preferably when the corresponding signal is unselected in accordance with the program selection information, the second switch circuit terminates the signal to match impedance. Of the ground wave digital and digital cable television signals, a signal that unselected in accordance with the program selection information is terminated. Ripple, streamed noise and the like's effects can be reduced.

Preferably the signal select circuit further includes an amplification circuit provided between the first input terminal and one input terminal of the first switch circuit and/or between the second input terminal and the other input terminal of the first switch circuit, and activated to amplify a corresponding signal selected in accordance with the program selection information, and inactivated when the corresponding signal is unselected in accordance with the program selection information. Of ground wave digital and digital cable television signals having a wide frequency band, a signal selected in accordance with the program selection information is amplified. Furthermore, the amplification circuit that employs a small noise figure, high gain element or a small distortion element allows ground wave digital and digital CATV signals having different characteristics to each be appropriately amplified.

Preferably the signal selection circuit further includes a variable amplification circuit provided between the first input terminal and one input terminal of the first switch circuit and/or between the second input terminal and the other input terminal of the first switch circuit, operative in response to a corresponding signal being selected in accordance with the program selection information to amplify the corresponding signal by a gain corresponding to the signal's level, and operative in response to the corresponding signal being unselected in accordance with the program selection information to fix the gain at a minimum value. Of ground wave digital and digital cable television signals having a wide frequency band, a signal selected in accordance with the program selection information is amplified to have a constant level. Furthermore, the signal unselected in accordance with the program selection information is maximally attenuated to provide impedance matching. Ripple, streamed noise and the like's effects can thus be reduced.

Preferably the signal selection circuit further includes a variable attenuator provided between the first input terminal and one input terminal of the first switch circuit and/or between the second input terminal and the other input terminal of the first switch circuit, operative in response to a corresponding signal being selected in accordance with the program selection information to attenuate the corresponding signal by an amount corresponding to the signal's level, and operative in response to the corresponding signal being unselected in accordance with the program selection information to fix the amount at a maximum value. Of ground wave digital and digital cable television signals, a signal selected in accordance with the program selection information is attenuated to have a constant level. Furthermore, the signal unselected in accordance with the program selection information is maximally attenuated to provide impedance matching. Ripple, streamed noise and the like's effects can thus be reduced.

Preferably the signal select circuit further includes an amplification circuit arranged subsequent to the variable attenuator, and operative in response to a corresponding signal being selected in accordance with the program selection information to amplify a signal output from the variable attenuator, and inactivated in response to the corresponding signal being unselected in accordance with the program selection information. Of ground wave digital and digital cable television signals having a wide frequency band, a signal selected in accordance with the program selection information is amplified Preferably the tuner further includes a control signal extraction circuit receiving the digital cable television signal for extracting a control signal applied to control an apparatus having the tuner incorporated therein, and the signal select circuit further includes a distribution circuit provided between the second input terminal and the other input terminal of the first switch circuit, and receiving the digital cable television signal from the second input terminal and providing the digital cable television signal to the other input terminal of the first switch circuit and the control signal extraction circuit. By the control signal extracted by the control signal extraction circuit a set top box having the tuner incorporated therein for receiving digital broadcasts can be controlled.

Preferably the signal select circuit further includes a coupling circuit provided between the second input terminal and the other input terminal of the first switch circuit and receiving the digital cable television signal from the second input terminal and providing the digital cable television signal to the other input terminal of the first switch circuit and providing an externally received transmitted data signal to the second input terminal. A tuner receiving digital broadcasts that accommodates bidirectional communication can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 indicates the FIG. 1 tuner's states of operation and isolation.

FIG. 3 indicates a ground wave digital signal's level and worst D/U ratio and a digital CATV signal's level and worst D/U ratio.

FIG. 5 indicates the FIG. 4 tuner's states of operation and isolation.

FIG. 7 indicates the FIG. 6 tuner's states of operation and isolation.

DESCRIPTION OF THE PREFERRED EMBODIMENTS

First Embodiment

Figure 1:
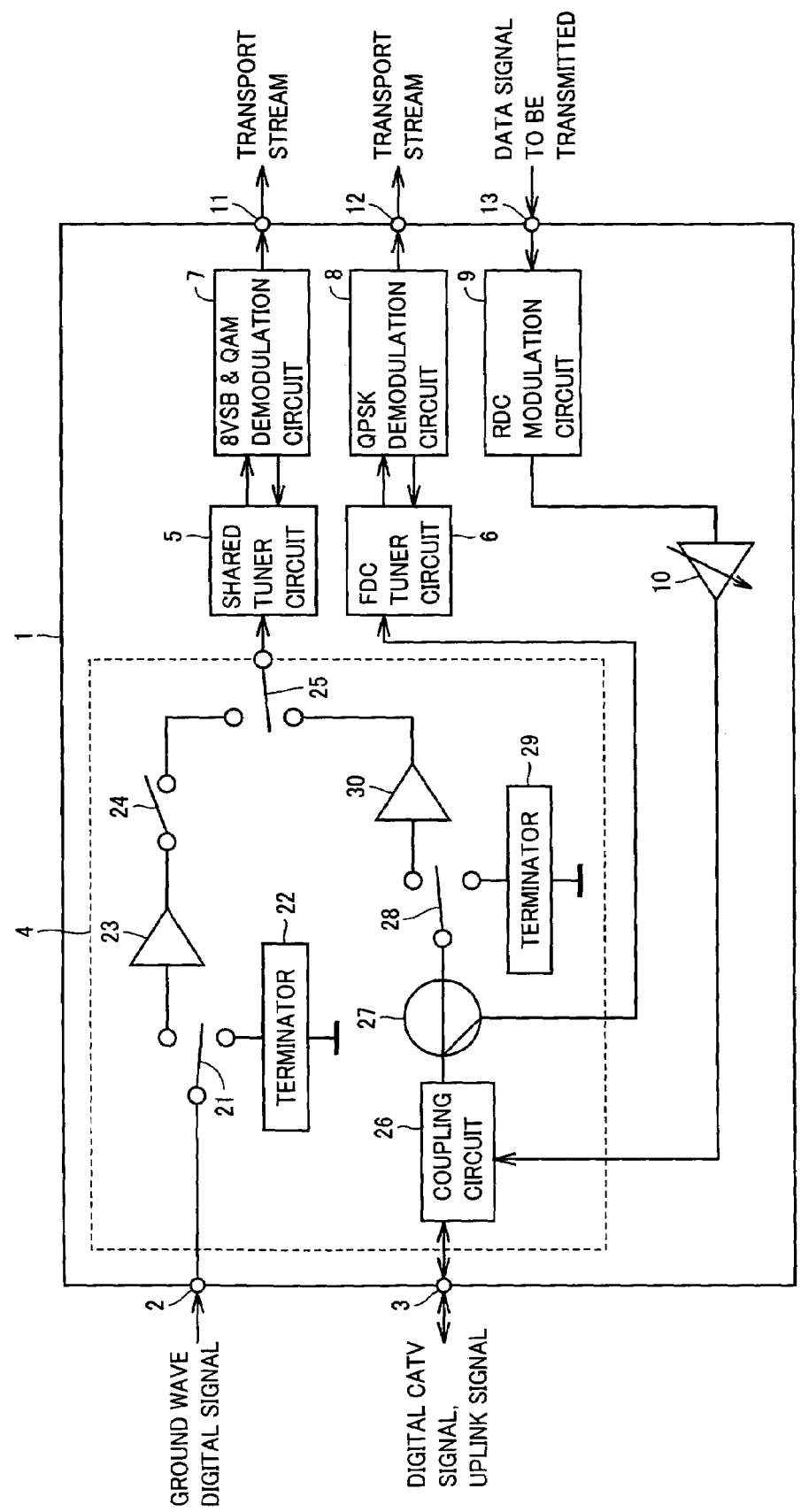
FIG. 1 is a block diagram schematically showing a configuration of the present tuner for digital broadcasts in a first embodiment.

With reference to FIG. 1, the present invention provides a tuner for digital broadcasts, including a casing 1, input terminals 2 and 13, an input/output terminal 3, a signal selector 4, a shared tuner circuit 5, an FD tuner circuit 6, an 8VSB and QAM demodulation circuit 7, a QPSK demodulation circuit 8, an RDC modulation circuit 9, a variable amplifier 10, and output terminals 11 and 12. This tuner accommodates bidirectional communication.

Signal selector 4 includes select circuits 21, 25 and 28, a 75Ω terminators 22 and 29, broadband amplifiers 23 and 30, a switch circuit 24, a coupling circuit 26, and a branch circuit 27. Select circuit 21, 25, 28 is a single pole double throw (SPDT) switch implemented by gallium arsenic (GaAs)-monolithic microwave IC (MMIC). Switch circuit 24 is implemented by a high speed switching diode.

An antenna receives a ground wave digital signal which is in turn provided through a coaxial cable to input terminal 2 connected to select circuit 21 at an input terminal. Select circuit 21 has one output terminal connected to broadband amplifier 23 at an input terminal, and the other output terminal connected to 75Ω terminator 22. Broadband amplifier 23 has an output terminal connected via switch circuit 24 to select circuit 23 at one input terminal.

A CATV station distributes a digital CATV signal which is in turn provided through coaxial cable to input/output terminal 3. Coupling circuit 26 receives the digital CATV signal from input/output terminal 3 and transmits the signal to branch circuit 27, and also receives an uplink signal from variable amplifier 10 and transmits the signal to input/output terminal 3. Branch circuit 27 receives the digital CATV signal from coupling circuit 26 and transmits the signal to an input terminal of select circuit 28 and FDC tuner circuit 6. Select circuit 28 has one output terminal connected to broadband amplifier 30 at an input terminal, and the other output terminal connected to 75Ω terminator 29. Broadband amplifier 30 has an output terminal connected to select circuit 25 at the other input terminal. Select circuit 25 has an output terminal connected to shared tuner circuit 5 at an input terminal.

When a ground wave digital broadcast is viewed, select circuit 21 is set through and transmits a ground wave digital signal from input terminal 2 to broadband amplifier 23. Broadband amplifier 23 amplifies a ground wave digital signal having a broad frequency band (54 MHz-806 MHz). Switch circuit 24 is switched on to transmit to select circuit 25 the ground wave digital signal amplified by broadband amplifier 23. Select circuit 25 transmits to shared tuner circuit 5 the ground wave digital signal received from input terminal 2 via select circuit 21, broadband amplifier 23 and switch circuit 24. Select circuit 28 receives a digital CATV signal from input/output terminal 3 via coupling circuit 22 and branch circuit 27 and provides the signal to 75Ω terminator 29 to provide impedance matching. Furthermore, broadband amplifier 30 is inactivated to stop its operation. As such, the digital CATV signal distributed from the CATV station is not transmitted to shared tuner circuit 5.

When a digital CATV broadcast is viewed, select circuit 28 receives a digital CATV signal from input/output terminal 3 via coupling circuit 26 and branch circuit 27 and transmits the signal to broadband amplifier 30. Broadband amplifier 30 amplifies a digital CATV signal having a broad frequency band (54 MHz-864 MHz). Select circuit 25 transmits to shared tuner circuit 5 the digital CATV signal amplified by broadband amplifier 30. Select circuit 21 receives the ground wave digital signal from input terminal 2 and provides the signal to 75Ω terminator 22 to provide impedance matching. Furthermore, broadband amplifier 23 is inactivated to stop its operation. Furthermore, switch circuit 24 is switched off. Thus the ground wave digital signal received by the antenna is not transmitted to shared tuner circuit 5.

When the ground wave digital broadcast is viewed, shared tuner circuit 5 selects only a signal of a desired channel from ground wave digital signals received from signal selector 4 and having a frequency band of 54 MHz-806 MHz and converts the selected signal to an IF signal. When the digital CATV broadcast is viewed, shared tuner circuit 5 selects only a signal of a desired channel from digital CATV signals received from signal selector 4 and having a frequency band of 54 MHz-864 MHz and converts the selected signal to an IF signal.

When the ground wave digital broadcast is viewed, 8VSB and QAM demodulation circuit 7 receives the IF signal from shared tuner circuit 5 and demodulates the signal in the 8VSB system to generate and provide a transport stream to output terminal 11. When the digital CATV broadcast is viewed, 8VSB and QAM demodulation circuit 7 receives the IF signal from shared tuner circuit 5 and demodulates the signal in the QAM system to generate and provide a transport stream to output terminal 11. Furthermore, 8VSB and QAM demodulation circuit 7 automatically controls shared tuner circuit 5 in gain so that shared tuner circuit 5 outputs a signal having a constant level. Output terminal 11 receives the transport stream, which is in turn converted by an external signal processing circuit to video, audio and data signals.

FDC tuner circuit 6 selects only a signal received from input/output terminal 3 via coupling circuit 26 and branch circuit 27 and arranged in the frequency band of 70 MHz-130 MHz for a forward data channel and converts the signal to an IF signal. QPSK demodulation circuit 8 receives the IF signal from FDC tuner circuit 6 and demodulates the signal in the QPSK system to generate and provide a transport stream to output terminal 12. Furthermore, QAM demodulation circuit 8 automatically controls FDC tuner circuit 6 in gain so that FDC tuner circuit 6 outputs a signal having a constant level. Output terminal 12 receives the transport stream, which is in turn converted by an external signal processing circuit to an STB control signal applied to control a set top box (e.g., provide a setting of whether a premiere channel is receivable).

Thus, shared tuner circuit 5 selects a signal of a desired channel from a ground wave digital signal and a digital CATV signal whereas FDC tuner circuit 6 extracts an STB control signal from a digital CATV signal. Note that FDC tuner circuit 6 and QPSK demodulation circuit 8 normally operate when ground wave digital and digital CATV broadcasts are viewed.

Input terminal 13 receives an externally transmitted data signal and passes the signal to RDC modulation circuit 9. RDC modulation circuit 9 receives the signal from input terminal 13 and modulates the signal in the QAM (or QPSK) system to provide a signal having the frequency band of 5 MHz-54 MHz (for a reverse data channel). Variable amplifier 10 receives the modulated signal from RDC modulation circuit 9 and amplifies the signal to attain an appropriate level: Coupling circuit 26 receives the amplified signal from variable amplifier 10 and transmits the signal to input/output terminal 3 as an uplink signal. Input/output terminal 3 receives and transmits the uplink signal through the co-axial cable to a CATV station.

The FIG. 1 tuner operates, as described hereinafter. FIG. 2 shows the FIG. 1 tuner's state of operation and isolation. With reference to FIG. 2, the tuner's state of operation is set as based on program selection information.

When a ground wave digital broadcast is viewed, select circuit 21 is set through. Broadband amplifier 23 performs a 15 dB amplification operation. Switch circuit 24 is switched on. Select circuit 25 selects a ground wave digital signal. Thus a ground wave digital signal received at input terminal 2 is transmitted via select circuit 21, broadband amplifier 23, switch circuit 24 and select circuit 25 to shared tuner circuit 5. Select circuit 28 provides a digital CATV signal received at input/output terminal 3 to 75Ω terminator 29 to provide impedance matching. Furthermore, broadband amplifier 30 is inactivated to stop its operation. Thus a digital CATV signal distributed from a CATV signal is not transmitted to shared tuner circuit 5. Shared tuner circuit 5 selects only a signal of a desired channel from a ground wave digital signal provided from select circuit 25 and converts the selected signal to an IF signal. 8VSB and QAM demodulation circuit 7 receives the IF signal from shared tuner circuit 5 and demodulates it in the 8VSB system.

At the time, signal selector 4 provides an isolation in total (or a worst value) composed of −15 dB of broadband amplifier 23 (as it performs the 15 dB amplification operation), 30 dB of select circuit 28 (because of 75Ω termination), 25 dB of broadband amplifier 30 (as it is inactivated), and 30 dB of select circuit 25 (as it selects a ground wave digital signal). In total it is 70 dB.

When a digital CATV broadcast is viewed, select circuit 28 is set through. Broadband amplifier 30 performs a 10 dB amplification operation. Select circuit 25 selects a digital CATV signal. Thus a ground wave digital signal received at input/output terminal 3 is transmitted via coupling circuit 26, branch circuit 27, select circuit 28, broadband amplifier 30, and select circuit 25 to shared tuner circuit 5. Select circuit 21 provides a ground wave digital signal received at input terminal 2 to 75Ω terminator 22 to provide impedance matching. Furthermore, broadband amplifier 23 is inactivated to stop its operation. Furthermore, switch circuit 24 is switched off. Thus a ground wave digital signal received by the antenna is not transmitted to shared tuner circuit 5. Shared tuner circuit 5 selects only a signal of a desired channel from a digital CATV signal provided from select circuit 25 and converts the selected signal to an IF signal. 8VSB and QAM demodulation circuit 7 receives the IF signal from shared tuner circuit 5 and demodulates it in the QAM system.

At the time, signal selector 4 provides an isolation in total (or a worst value) composed of 30 dB of select circuit 21 (because of 75Ω termination), 25 dB of broadband amplifier 23 (as it is inactivated), 10 dB of switch circuit 24 (as it is switched off), −10 dB of broadband amplifier 30 (as it performs the 10 dB amplification operation), and 30 dB of select circuit 25 (as it selects a digital CATV signal). In total, it is 85 dB.

It should be noted however that the total isolations of 70 dB and 80 dB in viewing a ground wave digital broadcast and a digital CATV broadcast, respectively, as described above are worst values for a reception frequency band of 54 MHz-864 MHz, and for a low frequency band of 54 MH-216 MHz the total isolations are improved by 25 dB or more, providing 95 dB and 100 dB, respectively.

Thus, when ground wave digital and digital CATV broadcasts are viewed, isolation can sufficiently be increased, and a signal less leaks. This can prevent a failure attributed to a ground wave digital signal and a digital CATV signal interfering with each other.

Note that FDC tuner 6, QPSK demodulation circuit 8 and RDC modulation circuit 9 normally operate when ground wave digital and digital CATV broadcasts are viewed.

FIG. 3 shows a ground wave digital signal's level and worst D/U (desired to undesired signal) ratio, and a digital CATV signal's level and worst D/U ratio. With reference to the figure, the ground wave digital signal provides a minimum level of −84 dBm and a maximum level of −8 dBm, and the digital CATV signal provides a minimum level or −64 dBm and a maximum level of −34 dBm. Furthermore, the fact that the ground wave digital signal's maximum level (−8 dBm) is greater than the digital CATV signal's maximum level (−34 dBm) and the fact that ground wave digital broadcasting and digital CATV broadcasting employ different modulation systems (the 8VSB system and the QAM system, respectively), are considered, and isolation in viewing a digital CATV broadcast is accordingly increased to be larger than that in viewing a ground wave digital broadcast. Furthermore, an isolation of at least 60 dB, which is larger than the ground wave digital and digital CATV signals' respective worst D/U ratios, can be ensured, and there is a limited possibility that ghost is caused.

With reference again to FIGS. 1 and 2, when ground wave digital and digital CATV broadcasts are viewed, input terminal 2 receiving a ground wave digital signal is matched in impedance. As such, if a ground wave digital signal is received by an antenna connected to equipment including the tuner for digital broadcasts and a plurality of other components, input terminal 2 receiving the ground wave digital signal is less affected by ripple, streamed noise (a large noise formed of noises picked up at a cable of each terminal and streaming together), and the like.

Furthermore, when ground wave digital and digital CATV broadcasts are viewed, input/output terminal 3 receiving a digital CATV signal is matched in impedance. As such, although input/output terminal 3 is connected by a coaxial cable to external, more than one equipment, it is less affected by ripple, streamed noise, and the like.

Broadband amplifier 23 employs a small noise figure, high gain element (having a gain of 15 dB) and broadband amplifier 30 employs a small distortion element (having a gain of 10 dB). Thus broadband amplifier 23 reduces noise for a ground wave digital signal having a wide range in level and broadband amplifier 30 reduces distortion for a digital CATV signal using multiple channels. Individually providing broadband amplifiers suitable in performance for a ground wave digital signal and a digital CATV signal, respectively, having different characteristics, allows each signal to be amplified appropriately. Furthermore, thus providing broadband amplifiers 23 and 30 to signal selector 40 can eliminate the necessity of providing a broadband amplifier at an initial stage of shared tuner circuit 5.

Thus in the first embodiment a tuner associated with ground wave digital broadcasting and that associated with digital CATV broadcasting can be implemented as a shared tuner unit surrounded by a single casing. Ground wave digital and digital CATV broadcasts can thus be received by a miniaturized, low power consumption, and inexpensive tuner.

Note that although not shown, broadband amplifier 23 and switch circuit 24 may be switched in arrangement. In that case, the tuner can also similarly operate and provide a similar effect.

Second Embodiment

Figure 4:
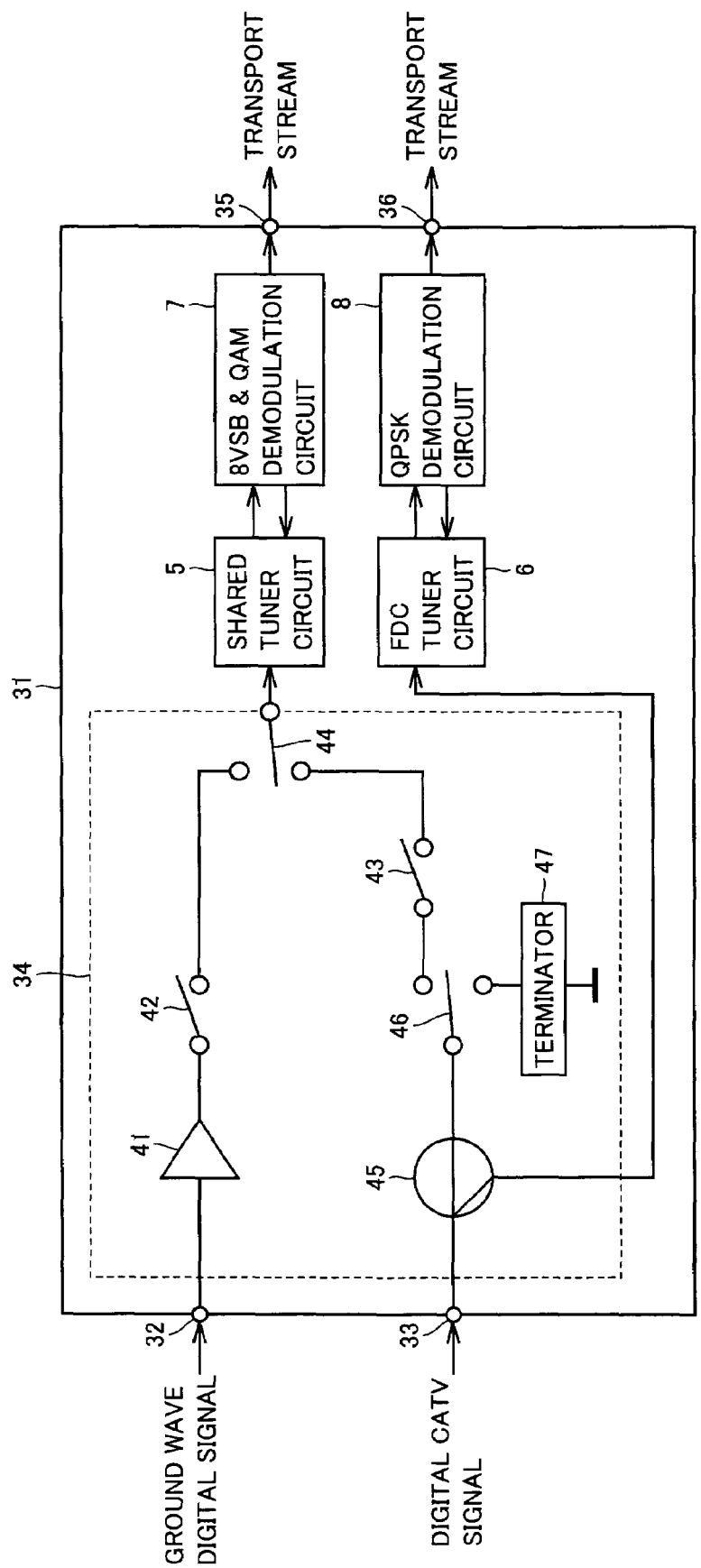
FIG. 4 is a block diagram schematically showing a configuration of the present tuner for digital broadcasts in a second embodiment.

FIG. 4 is a block diagram schematically showing a configuration of the present tuner employed to receive digital broadcasts in a second embodiment, as compared with FIG. 1. In FIG. 4, this tuner includes a casing 31, input terminals 32 and 33, a signal selector 34, shared tuner circuit 5, FDC tuner circuit 6, 8VSB and QAM demodulation circuit 7, PQSK demodulation circuit 8, and output terminals 35 and 36. The FIG. 4 tuner differs from the FIG. 1 tuner in that signal selector 4 is replaced with signal selector 34 and that RDC modulation circuit 9 and variable amplifier 10 are eliminated, and the FIG. 4 tuner does not accommodate bidirectional communication. Note that in FIG. 4, components corresponding to those shown in FIG. 1 are identically labeled and will not specifically be described.

Signal selector 34 includes a broadband amplifier 41, switch circuits 42 and 43, select circuits 44 and 46, a branch circuit 45, and a 75Ω terminator 47. Select circuit 44, 46 is a SPDT circuit implemented by a GaAs-MMIC. Switch circuit 42, 43 is implemented by a pin diode composed of p and n semiconductors with an i layer (an intrinsic semiconductor layer) posed therebetween.

An antenna receive a ground wave digital signal which is in turn transmitted through a coaxial cable to input terminal 32 connected to broadband amplifier 41 at an input terminal. Broadband amplifier 41 has an output terminal connected via switch circuit 42 to select circuit 44 at one input terminal.

A CATV station distributes a digital CATV signal which is in turn transmitted through a coaxial cable and received at input terminal 3. Branch circuit 45 receives the digital CATV signal from input terminal 33 and transmits the signal to an input terminal of select circuit 46 and FDC tuner circuit 6. Branch circuit 45 distributes the digital CATV signal's power by an asymmetrical ratio. Select circuit 46 has one output terminal connected via switch circuit 43 to select circuit 44 at the other input terminal, and has the other output terminal connected to 75Ω terminator 47. Select circuit 44 has an output terminal connected to shared tuner circuit 5 at an input terminal.

When a ground wave digital broadcast is viewed, switch circuit 42 is switched on and a ground wave digital signal amplified by broadband amplifier 41 by 15 dB is transmitted to select circuit 44. Select circuit 44 transmits to shared tuner circuit 5 the ground wave digital signal received from input terminal 32 via broadband amplifier 41 and switch circuit 42. Select circuit 46 receives a digital CATV signal from input terminal 33 via branch circuit 45 and provides the signal to 74Ω terminator 47 to provide impedance matching. Furthermore, switch circuit 43 is switched off. Thus a digital CATV signal distributed from a CATV station is not transmitted to shared tuner circuit 5.

When a digital CATV broadcast is viewed, switch circuit 43 is switched on and select circuit 46 receives a CATV signal from input terminal 33 via branch circuit 45 and transmits the signal via switch circuit 43 to select circuit 44. Broadband amplifier 41 is inactivated to stop its operation. Furthermore, switch circuit 42 is switched off. Thus a ground wave digital signal received by an antenna is not transmitted to shared tuner circuit 5.

Shared tuner circuit 5 selects only a signal of a desired channel from a ground wave digital or digital CATV signal received from signal selector 34 and converts the selected signal to an IF signal. 8VSB and QAM demodulation circuit 7 receives the IF signal from shared tuner circuit 5 and demodulates the signal in the 8VSB and QAM system to generate and provide a transport stream to output terminal 35. Furthermore, 8VSB and QAM demodulation circuit 7 automatically controls shared tuner circuit 5 in gain so that shared tuner circuit 5 outputs a signal having a constant level. Output terminal 35 receives the transport stream, which is in turn converted by an external signal processing circuit to video, audio and data signals.

FDC tuner circuit 6 selects only a signal received from input terminal 33 via branch circuit 45 and arranged in the frequency band of 70 MHz-130 MHz for a forward data channel and converts the signal to an IF signal. QPSK demodulation circuit 8 receives the IF signal from FDC tuner circuit 6 and demodulates the signal in the QPSK system to generate and provide a transport stream to output terminal 36. Furthermore, QAM demodulation circuit 8 automatically controls FDC tuner circuit 6 in gain so that FDC tuner circuit 6 outputs a signal having a constant level. Output terminal 36 receives the transport stream, which is in turn converted by an external signal processing circuit to an STB control signal.

The FIG. 4 tuner operates, as described hereinafter. FIG. 5 shows the FIG. 4 tuner's state of operation and isolation. With reference to FIG. 5, the tuner's state of operation is set as based on program selection information.

When a ground wave digital broadcast is viewed, broadband amplifier 41 performs a 15 dB amplification operation. Switch circuit 42 is switched on. Select circuit 44 selects a ground wave digital signal. Thus a ground wave digital signal received at input terminal 32 is transmitted via broadband amplifier 41, switch circuit 42 and select circuit 44 to shared tuner circuit 5. Select circuit 46 provides a digital CATV signal received at input terminal 33 to 75Ω terminator 47 to provide impedance matching. Furthermore, switch circuit 43 is switched off. Thus a digital CATV signal distributed from a CATV station is not transmitted to shared tuner circuit 5. Shared tuner circuit 5 selects only a signal of a desired channel from a ground wave digital signal received from select circuit 44 and converts the selected signal to an IF signal. 8VSB and QAM demodulation circuit 7 receives the IF signal from shared tuner circuit 5 and demodulates the signal in the 8VSB system.

At the time, signal selector 34 provides an isolation in total (or a worst value) composed of −15 dB of broadband amplifier 41 (as it performs the 15 dB amplification operation), 15 dB of switch circuit 43 (as it is switched off), 30 dB of select circuit 46 (because of 75Ω termination), and 30 dB of select circuit 44 (as it selects a ground wave digital signal). In total it is 60 dB.

When a digital CATV broadcast is viewed, select circuit 46 and switch 43 are set through and select circuit 44 selects a digital CATV signal. Thus a digital CATV signal received at input terminal 33 is transmitted via branch circuit 45, select circuit 46, switch circuit 43 and select circuit 44 to shared tuner circuit 5. Broadband amplifier 41 is inactivated to stop its operation. Furthermore, switch circuit 42 is switched off. Thus a ground wave digital signal received by the antenna is not transmitted to shared tuner circuit 5. Shared tuner circuit 5 selects only a signal of a desired channel from a digital CATV signal received from select circuit 44 and converts the selected signal to an IF signal. 8VSB and QAM demodulation circuit 7 receives the IF signal from shared tuner circuit 5 and demodulates the signal in the QAM system.

At the time, signal selector 34 provides an isolation in total (or a worst value) composed of 25 dB of broadband amplifier 41 (as it is inactivated), 15 dB of switch circuit 42 (as it is switched off), and 30 dB of select circuit 44 (as it selects a digital CATV signal). In total it is 70 dB.

It should be noted however that the total isolations of 60 dB and 70 dB in viewing a ground wave digital broadcast and a digital CATV broadcast, respectively, as described above are worst values for a reception frequency band of 54 MHz-864 MHz, and for a low frequency band of 54 MHz-216 MHz the total isolations are improved by 25 dB or more, providing 85 dB and 95 dB, respectively.

Thus, when ground wave digital and digital CATV broadcasts are viewed, isolation can sufficiently be increased, and a signal less leaks. This can prevent a failure attributed to a ground wave digital signal and a digital CATV signal interfering with each other. Furthermore, as described in the first embodiment, the fact that the ground wave digital signal's maximum level (−8 dBm) is greater than the digital CATV signal's maximum level (−34 dBm) and the fact that ground wave digital broadcasting and digital CATV broadcasting employ different modulation systems (the 8VSB system and the QAM system, respectively), are considered, and isolation in viewing a digital CATV broadcast is accordingly increased to be larger than that in viewing a ground wave digital broadcast.

Furthermore, when ground wave digital and digital CATV broadcasts are viewed, input terminal 33 receiving a digital CATV signal is matched in impedance. As such, although input terminal 33 is connected by a coaxial cable to external, more than one equipment, it is less affected by ripple, streamed noise, and the like.

By contrast, input terminal 32 receiving a ground wave digital signal is not 75Ω terminated when a digital CATV broadcast is viewed. As such, when ground wave digital and digital CATV broadcasts are viewed, input terminal 32 is not matched in impedance. However, typically a ground wave digital signal is received by an antenna connected to limited equipment, and input terminal 32 receiving the ground wave digital signal, although not matched in impedance, can be free from a significant effect of streamed noise and the like.

Broadband amplifier 41 employs a small noise figure, high gain (=15 dB) element, and shared tuner circuit 5 is adapted to consider performance associated with distortion. Thus, broadband amplifier 41 reduces noise for a ground wave digital signal having a wide range in level and shared tuner circuit 5 reduces distortion for a digital CATV signal employing multiple channels. Thus a ground wave digital signal and a digital CATV signal having different characteristics can each be appropriately amplified.

Thus in the second embodiment, as well as the first embodiment, a tuner associated with ground wave digital broadcasting and that associated with digital CATV broadcasting can be implemented as a shared tuner unit surrounded by a single casing. Ground wave digital and digital CATV broadcasts can thus be received by a miniaturized, low power consumption, and inexpensive tuner.

Note that although not shown, broadband amplifier 41 and switch circuits 42 and 43 may be switched in arrangement. In that case, the tuner can also similarly operate and provide a similar effect.

Furthermore, a switch circuit may be added between input terminal 32 and select circuit 44 and between input terminal 33 and select circuit 44. Further increased isolation and hence further reduced signal leakage can be achieved.

Furthermore, if it is not necessary to adapt a configuration considering noise figure, broadband amplifier 41 may be eliminated.

Furthermore, branch circuit 45, select circuit 46 and 75Ω terminator 47 may be replaced by a single distribution circuit. While branch circuit 45 has a large signal loss at a branch terminal connected to FDC tuner circuit 6, the distribution circuit provides a limited signal loss associated with distribution. Accordingly, when the distribution circuit is employed, FDC tuner 6, which normally operates, matches input terminal 33 in impedance.

Third Embodiment

Figure 6:
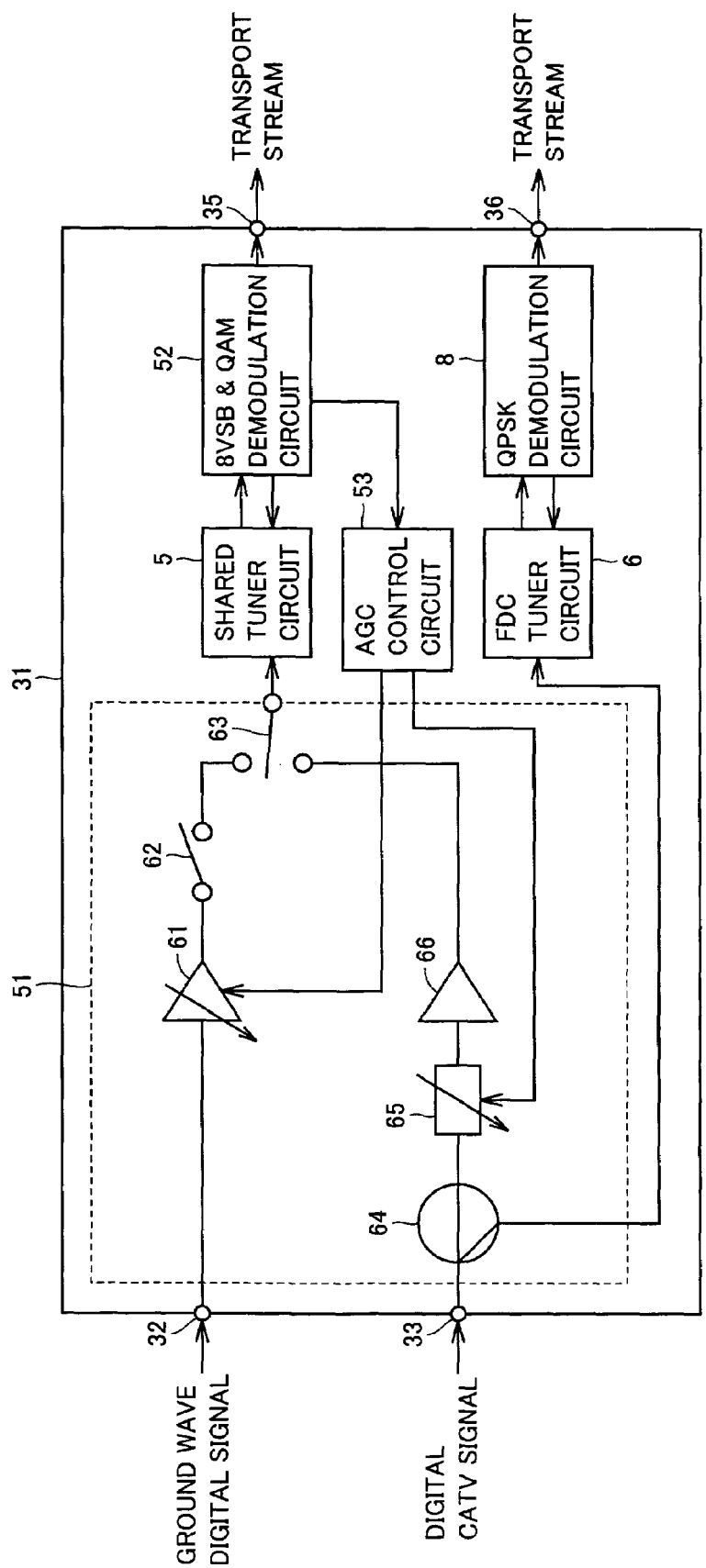
FIG. 6 is a block diagram schematically showing a configuration of the present tuner for digital broadcasts in a third embodiment.

FIG. 6 is a block diagram schematically showing a configuration of the present tuner employed to receive digital broadcasts in a third embodiment, as compared with FIG. 4. The FIG. 6 tuner differs from the FIG. 4 tuner in that signal selector 34 is replaced with a signal selector 51, that 8VSB and QAM demodulation circuit 7 is replaced with an 8VSB and QAM demodulation circuit 52 and that an AGC control circuit 53 is additionally introduced. Note that in FIG. 6 components corresponding to those shown in FIG. 4 are identically labeled and will not specifically be described.

Signal selector 51 includes a variable amplifier 61, a switch circuit 62, a select circuit 63, a branch circuit 54, a variable attenuator 65, and a broadband amplifier 66. Select circuit 63 is an SPDT switch implemented by a GaAs-MMIC. Switch circuit 62 is implemented by a pin diode composed of p and n semiconductors witch an i layer posed therebetween. Variable attenuator 65 has a π-type circuit configuration employing a pin diode with a forward resistance component controlled by a DC bias current and provides a variable amount of attenuation.

An antenna receives a ground wave digital signal which is in turn transmitted through a coaxial cable to input terminal 32 connected to broadband amplifier 61 at an input terminal. Broadband amplifier 61 has an output terminal connected via switch circuit 62 to select circuit 63 at one input terminal.

A CATV station distributes a digital CATV signal which is in turn transmitted through a coaxial cable and received at input terminal 33. Branch circuit 64 receives the digital CATV signal from input terminal 33 and transmits the signal to an input terminal of attenuator 65 and FDC tuner circuit 6. Attenuator 65 has an output terminal connected via broadband amplifier 66 to select circuit 63 at the other input terminal. Select circuit 63 has an output terminal connected to shared tuner circuit 5 at an input terminal.

When a ground wave digital broadcast is viewed, switch circuit 62 is switched on and a ground wave digital signal amplified by variable amplifier 61 to have an appropriate level is transmitted to select circuit 63. Variable amplifier 61 has a gain automatically controlled by AGC control circuit 53 so that variable amplifier 61 outputs a signal having a constant level. Select circuit 63 transmits to shared tuner circuit 5 the ground wave digital signal received from input terminal 32 via variable amplifier 61 and switch circuit 62. Variable attenuator 65 provides attenuation in an amount fixed by AGC control circuit 53 at a maximum value. A digital CATV signal distributed from a CATV station is thus not transmitted to shared tuner circuit 5.

When a digital CATV broadcast is viewed, variable attenuator 65 provides attenuation in an amount automatically controlled by AGC control circuit 53 so that variable attenuator 65 outputs a level having a constant level. Select circuit 63 receives a digital CATV signal from input terminal 33 via branch circuit 64, variable attenuator 65 and broadband amplifier 66 and transmits the signal to shared tuner circuit 5. Variable amplifier 61 has a gain fixed by AGC control circuit 53 at a minimum value (i.e., maximum attenuation operation). Furthermore, switch circuit 62 is switched off. Thus a ground wave digital signal received by the antenna is not transmitted to shared tuner circuit 5.

Shared tuner circuit 5 selects only a signal of a desired channel from a ground wave digital or digital CATV signal received from signal selector 51 and converts the selected signal to an IF signal. 8VSB and QAM demodulation circuit 52 receives the IF signal from shared tuner circuit 5 and demodulates the signal in the 8VSB and QAM system to generate and provide a transport stream to output terminal 35. Furthermore, 8VSB and QAM demodulation circuit 52 automatically controls shared tuner circuit 5 in gain to allow shared tuner circuit 5 to output a signal having a constant level, and also controls AGC control circuit 53.

When the ground wave digital broadcast is viewed AGC control circuit 53 automatically controls variable amplifier 61 in gain to allow variable amplifier 61 to output a signal having a constant level and also fixes the variable attenuator 65 attenuation in amount at a maximum value. When the digital CATV broadcast is viewed, AGC control circuit 53 automatically controls the variable attenuator 65 attenuation in amount to allow variable attenuator 65 to output a signal having a constant level and also fixes the variable amplifier 61 in gain at a minimum value. Terminal 35 receives the transport stream, which is in turn converted by an external signal processing circuit to video, audio, and data signals.

FDC tuner circuit 6 selects only a signal received from input terminal 33 via branch circuit 64 and arranged in the frequency band of 70 MHz-130 MHz for a forward data channel and converts the signal to an IF signal. QPSK demodulation circuit 8 receives the IF signal from FDC tuner circuit 6 and demodulates the signal in the QPSK system to generate and provide a transport stream to output terminal 36. Furthermore, QAM demodulation circuit 8 automatically controls FDC tuner circuit 6 in gain so that FDC tuner circuit 6 outputs a signal having a constant level. Output terminal 36 receives the transport stream, which is in turn converted by an external signal processing circuit to an STB control signal.

The FIG. 6 tuner operates, as described hereinafter. FIG. 7 shows the FIG. 6 tuner's state of operation and isolation. With reference to FIG. 7, the tuner's state of operation is set as based on program selection information.

When a ground wave digital broadcast is viewed, variable amplifier 61 outputs a signal controlled by AGC control circuit 53 to have a constant level. Switch circuit 62 is switched on. Select circuit 63 selects a ground wave digital signal. A ground wave digital signal received at input terminal 32 is thus transmitted via broadband amplifier 61, switch circuit 62 and select circuit 63 to shared tuner circuit 5. Variable attenuator 65 provides attenuation in an amount fixed by AGC control circuit 53 at a maximum value. Furthermore, broadband amplifier 66 is inactivated to stop its operation. A digital CATV signal distributed from a CATV station is thus not transmitted to shared tuner circuit 5. Shared tuner circuit 5 selects only a signal of a desired channel from a ground wave digital signal received from select circuit 63 and converts the selected signal to an IF signal. 8VSB and QAM demodulation circuit 52 receives the IF signal from shared tuner circuit 5 and demodulates the signal in the 8VSB system.

At the time, signal selector 51 provides an isolation in total (or a worst value) composed of 25 dB of variable attenuator 65 (as it operates to provide maximized attenuation), 25 dB of broadband amplifier 66 (as it is inactivated), and 30 dB of select circuit 63 (as it selects a ground wave digital signal). In total it is 80 dB. It should be noted, however, that variable amplifier 61 has a variable in gain and when the fact that the amplifier's isolation falls within a range of −20 dB to −25 dB is considered, the isolation in total (or the worst value) will be 60 dB.

When a digital CATV broadcast is viewed, variable attenuator 65 outputs a signal controlled by AGC control circuit 53 to have a constant level. Broadband amplifier 66 performs a 10 dB amplification operation. Select circuit 63 selects a digital CATV signal. A digital CATV signal received at input terminal 33 is thus transmitted via branch circuit 64, variable attenuator 65, broadband amplifier 66 and select circuit 63 to shared tuner circuit 5. The variable amplifier 61 gain is fixed by AGC control circuit 53 at a minimum value (i.e., maximum attenuation operation). Furthermore, switch circuit 62 is switched off. A ground wave digital signal received by the antenna is thus not transmitted to shared tuner circuit 5. Shared tuner circuit 5 selects only a signal of a desired channel from a digital CATV signal received from select circuit 63 and converts the selected signal to an IF signal. 8VSB and QAM demodulation circuit 52 receives the IF signal from shared tuner circuit 5 and demodulates the signal in the QAM system.

At the time, signal selector 51 provides an isolation in total (or a worst value) composed of 25 dB of variable amplifier 61 (maximum attenuation operation), 15 dB of switch circuit 62 (as it is switched off), −10 dB of broadband amplifier 66 (as it performs 10 dB amplification operation), and 30 dB of select circuit 63 (as it selects a digital CATV signal). In total it is 60 dB. Note that variable attenuator 65 provides a variable amount of attenuation and if the fact that the attenuator's isolation falls within a range of 0 dB to 25 dB is considered, the isolation in total (or the worst value) will be 60 dB.

It should be noted however that the total isolation of 60 dB in viewing ground wave digital and digital CATV broadcasts, as described above, is a worst value for a reception frequency band of 54 MHz-864 MHz, and for a low frequency band of 54 MHz-216 MHz the total isolation is improved by 25 dB or more, providing 85 dB.

Thus, when ground wave digital and digital CATV broadcasts are viewed, isolation can sufficiently be increased, and a signal less leaks. This can prevent a failure attributed to a ground wave digital signal and a digital CATV signal interfering with each other.

Furthermore, when a ground wave digital broadcast is viewed, broadband amplifier 66 is inactivated, while variable attenuator 65 provides attenuation in an amount fixed at the maximum value. Thus in viewing ground wave digital and digital CATV broadcasts input terminal 33 is matched in impedance. As such, although input terminal 33 is connected by a coaxial cable to external, more than one equipment, it is less affected by ripple, streamed noise, and the like.

Variable amplifier 61 employs a small in noise figure, high gain element. As such, variable amplifier 61 reduces noise for a ground wave digital signal having a wide range in level. Furthermore, in viewing a digital CATV broadcast, variable amplifier 61 is large in isolation and a signal less leaks.

Furthermore, broadband amplifier 66 preceded by variable attenuator 65 can receive a signal having a limited maximum level. As such, if broadband amplifier 66 is a high gain element a digital CATV signal is not impaired in distortion ratio. Thus, ground wave digital and digital CATV signals having different characteristics can each be appropriately amplified.

Thus in the third embodiment, as well as the first and second embodiments, a tuner associated with ground wave digital broadcasting and that associated with digital CATV broadcasting can be implemented as a shared tuner unit surrounded by a single casing. Ground wave digital and digital CATV broadcasts can thus be received by a miniaturized, low power consumption, and inexpensive tuner.

Third Embodiment in Exemplary Variation

Figure 8:
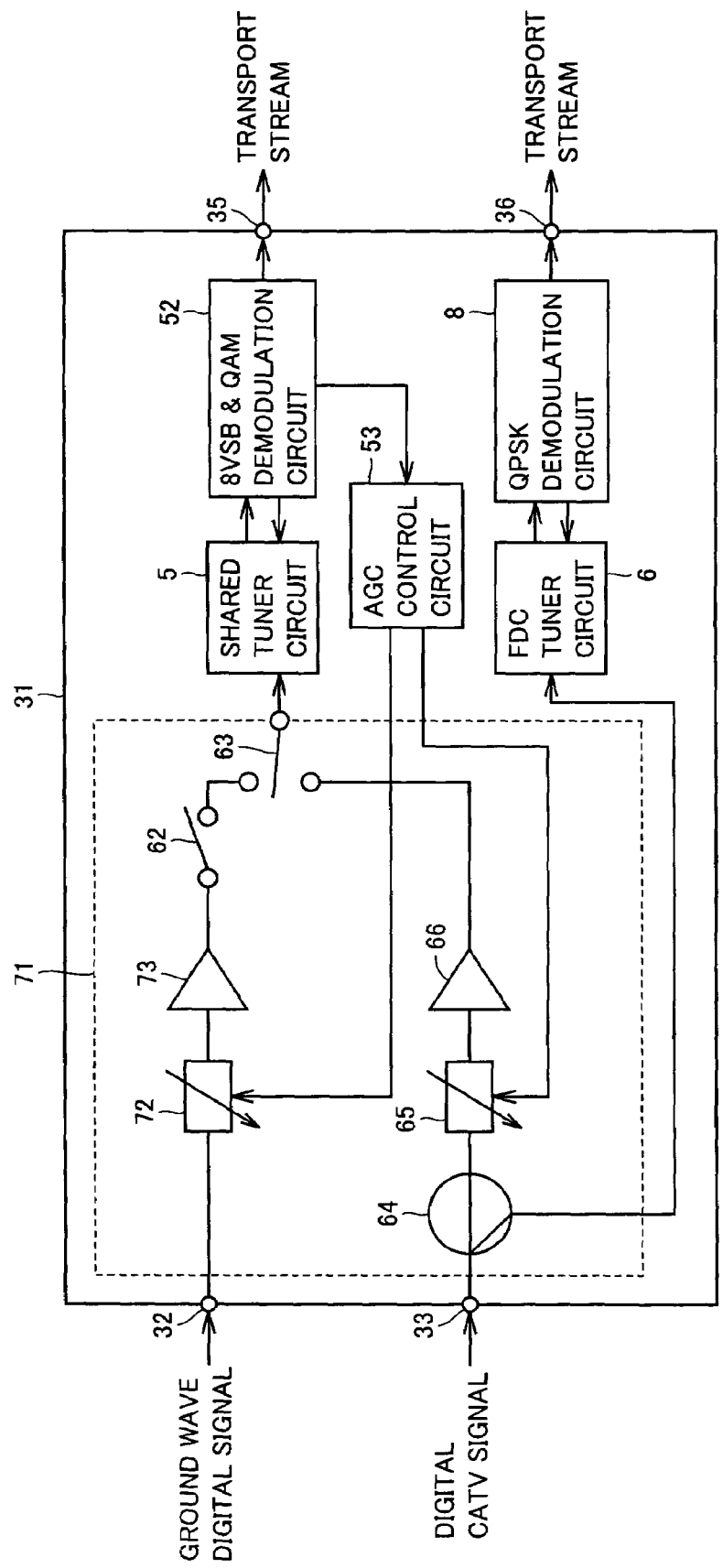
FIG. 8 is a block diagram schematically showing a configuration of the present tuner for digital broadcasts in the third embodiment in an exemplary variation.

FIG. 8 is a block diagram schematically showing a configuration of the present tuner employed to receive digital broadcasts in the third embodiment in an exemplary variation, as compared with FIG. 6. The FIG. 8 tuner differs from the FIG. 6 tuner in that variable amplifier 61 is eliminated and that a variable attenuator 72 and a broadband amplifier 73 are additionally introduced. Note that in FIG. 8 components corresponding to those shown in FIG. 6 are identically labeled and will not specifically be described.

In a signal selector 71 variable attenuator 72, as well as variable attenuator 65, has a π-type circuit configuration employing a pin diode with a forward resistance component controlled by a DC bias current and provides a variable amount of attenuation.

When a digital CATV broadcast is viewed, variable attenuator 72 provides attenuation in an amount automatically controlled by AGC control circuit 53 so that variable attenuator 65 outputs a level having a constant level. Switch circuit 62 is switched on and a ground wave digital signal amplified by broadband amplifier 73 is transmitted to select circuit 63. Select circuit 63 transmits the signal to shared tuner circuit 5.

When a digital CATV broadcast is viewed, variable attenuator 72 provides attenuation in an amount fixed by AGC control circuit 53 at a maximum value. Furthermore, switch circuit 62 is switched off. A ground wave digital signal received by the antenna is thus not transmitted to shared tuner circuit 5.

Broadband amplifier 73 employs a small noise figure, high gain element. Thus broadband amplifier 73 reduces noise for a ground wave digital signal having a wide range in level.

Thus in the third embodiment in an exemplary variation, as well as the third embodiment, a tuner associated with ground wave digital broadcasting and that associated with digital CATV broadcasting can be implemented as a shared tuner unit surrounded by a single casing. Ground wave digital and digital CATV broadcasts can thus be received by a miniaturized, low power consumption, and inexpensive tuner.

Third Embodiment in Another Exemplary Variation

Figure 9:
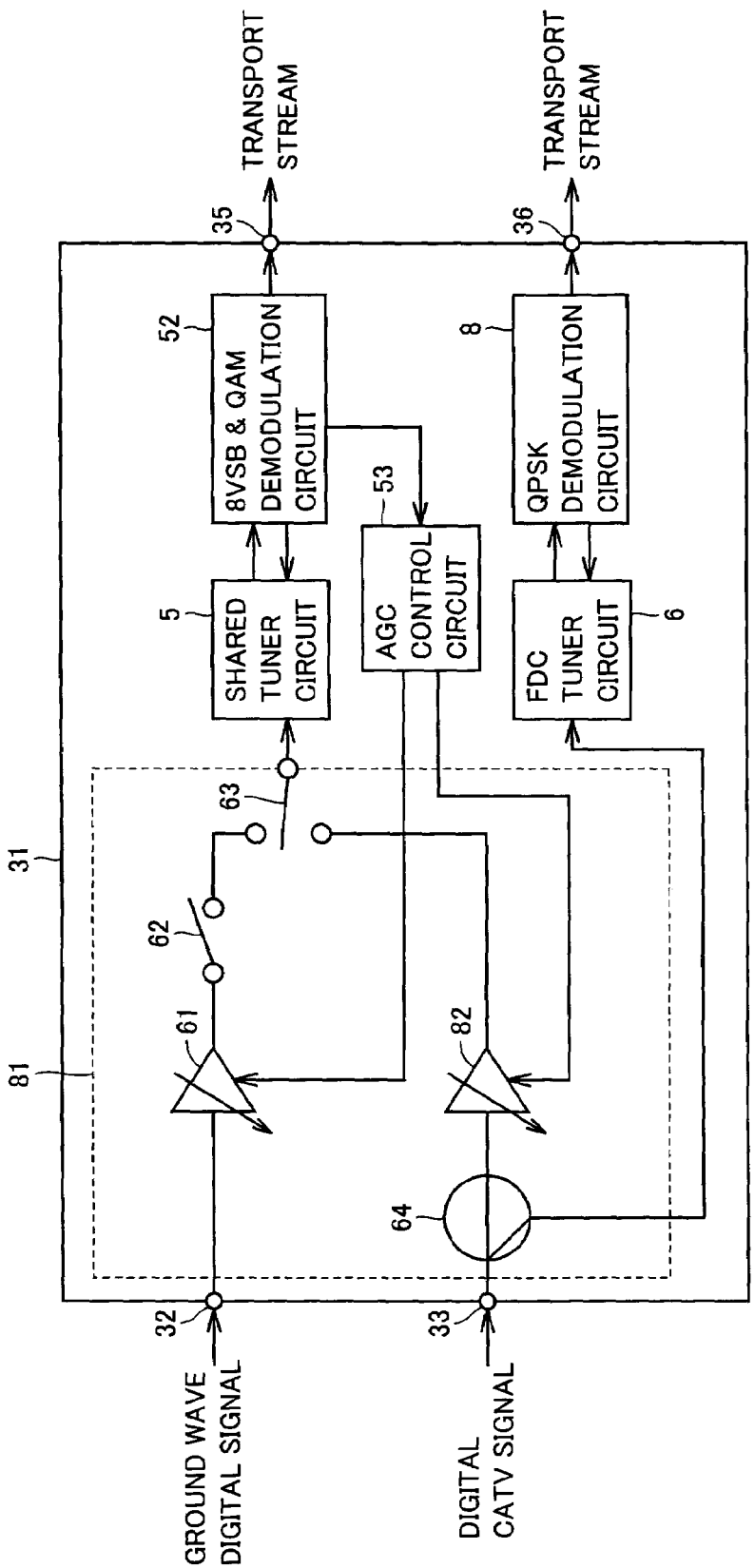
FIG. 9 is a block diagram schematically showing a configuration of the present tuner for digital broadcasts in the third embodiment in another exemplary variation.
Figure 10:
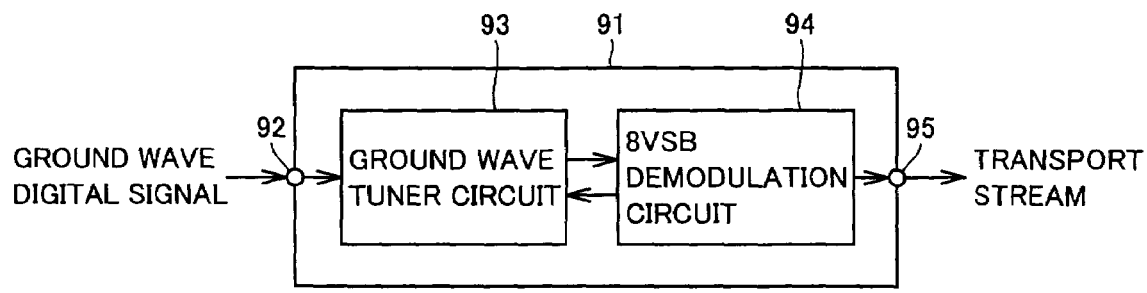
FIG. 10 is a block diagram showing a configuration of a conventional tuner for ground wave digital broadcasts for North America.
Figure 11:
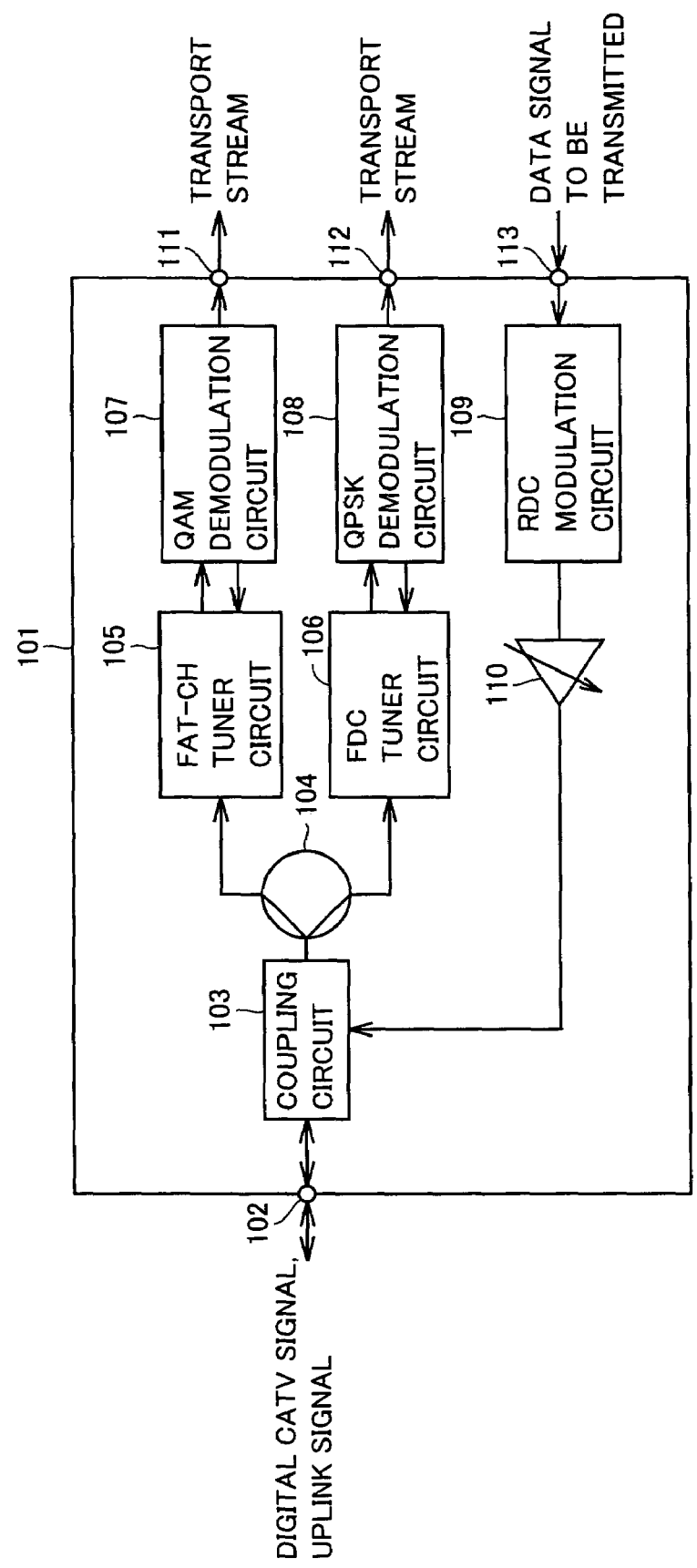
FIG. 11 is a block diagram showing a configuration of a conventional tuner for digital CATV broadcasts for North America.

FIG. 9 is a block diagram schematically showing a configuration of the present tuner employed to receive digital broadcasts in the third embodiment in another exemplary variation, as compared with FIG. 6. The FIG. 9 tuner differs from the FIG. 6 tuner in that variable attenuator 65 and broadband amplifier 66 are eliminated and that a variable amplifier 82 is additionally introduced. Note that in FIG. 9 components corresponding to those shown in FIG. 6 are identically labeled and will not specifically be described.

In a signal selector 81 variable amplifier 82 has its gain controlled by AGC control circuit 53. When a digital CATV broadcast is viewed, variable amplifier 82 has its gain automatically controlled by AGC control circuit 53 and outputs a signal set to have a constant level. Select circuit 63 transmits to shared tuner circuit 5 a digital CATV signal amplified by variable amplifier 82.

When a ground wave digital broadcast is viewed, the variable amplifier 82 gain is fixed by AGC control circuit 53 at a minimum value (i.e., maximum attenuation operation). Thus a digital CATV signal distributed from a CATV station is not transmitted to shared tuner circuit 5.

Variable amplifier 82 employs a small distortion element. As such, variable amplifier 82 reduces distortion for a digital CATV signal employing multiple channels.

Thus in the third embodiment in another exemplary variation, as well as the third embodiment, a tuner associated with ground wave digital broadcasting and that associated with digital CATV broadcasting can be implemented as a shared tuner unit surrounded by a single casing. Ground wave digital and digital CATV broadcasts can thus be received by a miniaturized, low power consumption, and inexpensive tuner.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A tuner receiving a ground wave digital broadcast and a digital cable television broadcast, comprising:
a first input terminal receiving a ground wave digital signal received by an antenna;
a second input terminal receiving a digital cable television signal distributed through a cable;
signal selector selecting in accordance with program selection information and outputting one of said ground wave digital signal and said digital cable television signal received from said first and second input terminals, respectively; and
tuning unit selecting a signal of a desired channel from a signal output from said signal selector,
wherein said signal selector includes a first switch circuit having one input terminal receiving said ground wave digital signal from said first input terminal, the other input terminal receiving said digital cable television signal from said second input terminal, and an output terminal connected to a shared tuning circuit at an input terminal, and
wherein said digital cable television signal is also provided to a second tuning circuit.

2. The tuner according to claim 1, wherein said signal selector further includes an amplification circuit provided between said first input terminal and said one input terminal of said first switch circuit and/or between said second input terminal and said other input terminal of said first switch circuit, and activated to amplify a corresponding signal selected in accordance with said program selection information, and inactivated when said corresponding signal is unselected in accordance with said program selection information.

3. The tuner according to claim 1, wherein said signal selector further includes a variable amplification circuit provided between said first input terminal and said one input terminal of said first switch circuit and/or between said second input terminal and said other input terminal of said first switch circuit, operative in response to a corresponding signal being selected in accordance with said program selection information to amplify said corresponding signal by a gain corresponding to said signal's level, and operative in response to said corresponding signal being unselected in accordance with said program selection information to fix said gain at a minimum value.

4. The tuner according to claim 1, wherein said signal selector further includes a variable attenuator provided between said first input terminal and said one input terminal of said first switch circuit and/or between said second input terminal and said other input terminal of said first switch circuit, operative in response to a corresponding signal being selected in accordance with said program selection information to attenuate said corresponding signal by an amount corresponding to said signal's level, and operative in response to said corresponding signal being unselected in accordance with said program selection information to fix said amount at a maximum value.

5. The tuner according to claim 4, wherein said signal selector further includes an amplification circuit arranged subsequent to said variable attenuator, and operative in response to a corresponding signal being selected in accordance with said program selection information to amplify a signal output from said variable attenuator, and inactivated in response to said corresponding signal being unselected in accordance with said program selection information.

6. A tuner receiving a ground wave digital broadcast and a digital cable television broadcast, comprising:
a first input terminal receiving a ground wave digital signal received by an antenna;
a second input terminal receiving a digital cable television signal distributed through a cable;
signal selector selecting in accordance with program selection information and outputting one of said ground wave digital signal and said digital cable television signal received from said first and second input terminals, respectively; and
tuning unit selecting a signal of a desired channel from a signal output from said signal selector,
wherein said signal selector includes a first switch circuit having one input terminal receiving said ground wave digital signal from said first input terminal, the other input terminal receiving said digital cable television signal from said second input terminal, and an output terminal connected to said tuning unit at an input terminal, and
wherein said signal selector further includes a second switch circuit provided between said first input terminal and said one input terminal of said first switch circuit and/or between said second input terminal and said other input terminal of said first switch circuit, and passing and interrupting a corresponding signal selected and unselected, respectively, in accordance with said program selection information.

7. The tuner according to claim 6, wherein when said corresponding signal is unselected in accordance with said program selection information, said second switch circuit terminates said signal to match impedance.

8. A tuner receiving a ground wave digital broadcast and a digital cable television broadcast, comprising:
a first input terminal receiving a ground wave digital signal received by an antenna;
a second input terminal receiving a digital cable television signal distributed through a cable;
signal selector selecting in accordance with program selection information and outputting one of said ground wave digital signal and said digital cable television signal received from said first and second input terminals, respectively; and
tuning unit selecting a signal of a desired channel from a signal output from said signal selector,
wherein said signal selector includes a first switch circuit having one input terminal receiving said ground wave digital signal from said first input terminal, the other input terminal receiving said digital cable television signal from said second input terminal, and an output terminal connected to said tuning unit at an input terminal, and
wherein a control signal extraction unit receiving said digital cable television signal for extracting a control signal applied to control an apparatus having the tuner incorporated therein, wherein said signal selector further includes distribution unit provided between said second input terminal and said other input terminal of said first switch circuit, and receiving said digital cable television signal from said second input terminal and providing said digital cable television signal to said other input terminal of said first switch circuit and said control signal extraction unit.

9. A tuner receiving a ground wave digital broadcast and a digital cable television broadcast, comprising:

a first input terminal receiving a ground wave digital signal received by an antenna;

a second input terminal receiving a digital cable television signal distributed through a cable;

signal selector selecting in accordance with program selection information and outputting one of said ground wave digital signal and said digital cable television signal received from said first and second input terminals, respectively; and tuning unit selecting a signal of a desired channel from a signal output from said signal selector, wherein said signal selector includes a first switch circuit having one input terminal receiving said ground wave digital signal from said first input terminal, the other input terminal receiving said digital cable television signal from said second input terminal, and an output terminal connected to said tuning unit at an input terminal, and wherein said signal selector further includes a coupling circuit provided between said second input terminal and said other input terminal of said first switch circuit and receiving said digital cable television signal from said second input terminal and providing said digital cable television signal to said other input terminal of said first switch circuit and providing an externally received transmitted data signal to said second input terminal.

* * * * *